United States Patent Office 3,758,427
Patented Sept. 11, 1973

3,758,427
PROCESS FOR THE MANUFACTURE OF EPOXY-MODIFIED POLYURETHANE RESINS WHICH CAN BE DILUTED WITH WATER OR DISPERSED IN WATER
Themistoklis Katsibas, Hamburg, Germany, assignor to Reichhold-Albert-Chemie Aktiengesellschaft, Hamburg, Germany
No Drawing. Filed Dec. 7, 1970, Ser. No. 95,921
Claims priority, application Switzerland, Dec. 8, 1969, 18,225/69
Int. Cl. C08g 5/20
U.S. Cl. 260—19 EP  3 Claims

ABSTRACT OF THE DISCLOSURE

The subject of the invention is a process for the manufacture of oxidatively drying, epoxy-modified polyurethanes or polyurethane copolymers resins, which can be diluted with water or dispersed in water, characterized in that:

(I)

(a) unsaturated fatty acids, of which 0 to 25 percent by weight can be present as drying oils, with the unsaturated fatty acids and/or the drying oils optionally containing up to 6 percent by weight of maleic anhydride as an adduct, and with the mixture possessing iodine numbers of about 130 to 390,
(b) aliphatic, cycloaliphatic or aromatic carboxylic acids or hydroxy-carboxylic acids, individually or as a mixture, or their anhydrides, where these exist,
(c) monohydric and/or polyhydric hydroxy compounds,
(d) polyoxyalkylene compounds which contain at least one atom of active hydrogen and have an average molecular weight of the polyoxyalkylene chain of about 200 to 50,000, individually or as a mixture,
(e) epoxide compounds which contain at least one epoxide group, individually or as a mixture, and
(f) copolymerizable monomers, individually or as a mixture, are reacted conjointly or stepwise by heating until the reaction product has an acid number of zero to 300, (II)

the resulting ester and/or ester-ether, carrying hydroxyl groups and if required carrying carboxyl groups, is reacted by warming with (g) unsaturated monoalcohols and/or polyalcohols or their mixtures, and
(h) isocyanates, individually or as a mixture, with the reaction of the component (I) with (g) and (h) taking place conjointly, or with (g) and (h) having beforehand been reacted to give an intermediate product; in all reactions the components (I) (optionally (g)) should be employed in such a way, through selection of the amounts, that the total hydroxyl group equivalent bears a ratio of 1.01 to 1.45 to the isocyanate equivalent, (III)

(i) and that optionally, where the polyurethane resin contains carboxyl groups, this resin is converted, by the addition of alkali and/or strong bases, into the state where it can be dispersed in water or diluted with water.

BACKGROUND OF INVENTION

Several procedures are known in which attempts have been made to manufacture air-drying binders, which can be diluted with water by the incorporation of polyoxyalkylene compounds. Thus condensation products which can be diluted with water are obtained by reaction of polyethylene glycols with polybasic carboxylic acids or adducts of, for example, maleic anhydride and a fatty acid of a drying oil (compare U.S. Pat. specification 2,634,245). In a further known process the manufacture of alkyd resins which can be dispersed in water is effected by esterifying alkyd resins, containing carboxyl groups, with polyethylene glycols. Furthermore, the modification has, in similar binders, been effected with copolymerizable monomers as well as with epoxide resins (compare German displayed specification 1,231,433). The combination of manufacturing adducts of oxidatively drying systems with isocyanates and polyoxyalkylene compounds has also become known in several versions (compare French patent specification 1,468,487). Through binders which can be diluted with water are obtained according to these known processes, the film-forming properties of a conventionally oxidatively drying resin have not been attained.

The aim of the present invention is to provide such air-drying synthetic resins which can be diluted with water or dispersed in water, as possess all requisite properties with respect to lacquer technology and display significantly improved drying properties, coupled with excellent film quality and high gloss, after drying, and which are furthermore distinguished by high storage stability and excellent flow properties and anti-corrosion properties.

It is a further task of the present invention to manufacture improved synthetic resins for binders, which combine the good properties of the epoxide resins and polyurethane resins and which can be dispersed in water and/or diluted with water.

SUMMARY OF INVENTION

The subject of the invention is a process for the manufacture of oxidatively drying, epoxy-modified polyurethanes or polyurethane copolymer resins, which can be diluted with water or dispersed in water, characterized in that:

(I)

(a) 25 to 70 percent by weight of unsaturated fatty acids, of which 0 to 25 percent by weight can be present as drying oils, with the unsaturated fatty acids and/or the drying oils optionally containing up to 6 percent by weight of maleic anhydride as an adduct, and with the mixture possessing iodine numbers of about 130 to 390,
(b) up to 30 percent by weight of aliphatic, cycloaliphatic or aromatic carboxylic acids or hydroxy-carboxylic acids, individually or as a mixture, or their anhydrides, where these exist,
(c) 3 to 35 percent by weight of monohydric and/or polyhydric organic hydroxy compounds,
(d) up to 17 percent by weight of polyoxyalkylene compounds which contain at least one atom of active hydrogen and have an average molecular weight of the polyoxyalkylene chain of about 200 to 50,000, individually or as a mixture,
(e) 1 to 50 percent by weight of epoxide compounds which contain at least one epoxide group, individually or as a mixture, and
(f) up to 60 percent by weight of copolymerizable monomers, individually or as a mixture, are reacted conjointly or stepwise by heating until the reaction product has an acid number of zero to 300, (II)

the resulting ester and/or ester-ether, carrying hydroxyl groups and if required carrying carboxyl groups, is reacted by warming with (g) up to 65 percent by weight of unsaturated monoalcohols and/or polyalcohols or their mixtures, and (h) 0.05 to 50 percent by weight of isocyanates, individually or as a mixture, with the reaction of the component (I) with (g) and (h) taking place conjointly, or with (g) and (h) having beforehand been reacted to give an intermediate product; in all reactions the components (I) (optionally (g)) should be employed in such a way, through selection of the amounts, that the total hydroxyl group equivalent bears a ratio of 1.01 to 1.45 to the isocyanate equivalent, (III)

(i) and that optionally, where the polyurethane resin contains carboxyl groups, this resin is converted, by the addition of alkali and/or organic strong bases, into the state where it can be dispersed in water or diluted with water.

PREFERRED EMBODIMENTS OF INVENTION

In a special embodiment the polyurethane resin consists of the following components:

(I)

(a) 25 to 70% by weight of unsaturated fatty acids with iodine numbers of 130 to 390,
(b) 5 to 25% by weight of aromatic polycarboxylic acids alone or in mixture, respectively their anhydrides, if they exist.
(c) 3 to 35% by weigh tof mono- and/or polyvalent organic hydroxyl groups,
(d) zero,
(e) 1 to 50% by weight of epoxy compounds containing at least one epoxy group alone or in mixture,
(f) zero, whereby the component (b) is contained in such quantities that the condensation product possesses acid numbers of 20 to 50 in sequence (I), and the acid numbers are based on carboxyl groups which are bound to secondary and/or tertiary carbon atoms, (II)

(g) 4 to 50% by weight of isocyanates alone or in mixture, (III)

(i) and polyurethane resin containing carboxyl groups is converted into the water dispersable respectively water thinnable phase by the addition of alkali and/or organic bases.

In a further embodiment of the invention a polyurethane resin consists of the following components:

(I)

(a) 25 to 70% by weight unsaturated fatty acids with iodine numbers of 130 to 390,
(b) zero,
(c) 3 to 35% by weight of mono- and/or polyvalent organic hydroxyl compounds,
(d) 2 to 9% by weight of polyoxyalkylene compounds containing at least 1 atom of active hydrogen with an average molecular weight of the polyoxyalkylene chain of about 3000,
(e) 1 to 50% by weight of epoxy compounds containing at least one epoxy group alone or in mixture,
(f) zero, (II)

(g) 2 to 25 %by weight of unsaturated mono- and/or polyalcohols or their mixtures,
(h) 4 to 50% by weight of isocyanates alone or in mixture, and In a further embodiment of the invention a polyurethane resin consists of the following components:

(I)

(a) 25–45% by weight of unsaturated fatty acids, 25% by weight of which are present as drying oils, and the mixture possesses iodine numbers of 130 to 390.
(b) 2 to 30% by weight of aliphatic, cycloaliphatic, aromatic carboxylic acids alone or in mixture if they exist,
(c) 3 to 35% by weight of mono- and/or polyvalent organic hydroxy compound,
(d) 2 to 9% by weight polyoxyalkylene compounds containing at least one atom of active hydrogen with an average molecular weight in the polyoxyalkylene chain of about 3000,
(e) 1 to 50% by weight of epoxy compounds containing at least one epoxy group alone or in mixture,
(f) zero, whereby the component (b) is present in such quantities that the condensation product has acid numbers of 10 to 60 in the sequence (I), and whereby the acid numbers are based on carboxyl groups which are bound to secondary and/or tertiary carbon atoms, (II)

(g) 2 to 25% by weight of unsaturated mono- and/or polyalcohols or their mixtures,
(h) 4 to 50% by weight of isocyanates alone or in mixture, (III)

(i) and carboxyl groups containing polyurethane resins converted into the water dispersable respectively water thinnable phase by addition of alkali and/or organic strong bases.

In a further special embodiment of the invention a polyurethane copolymerization resin consists of the following components:

(I)

(a) 25–70% by weight of unsaturated fatty acids, 25% by weight of which are present as drying oils and the mixture has an iodine number from about 130 to 390,
(b) zero,
(c) 3 to 35% by weight of mono- and/or polyvalent organic hydroxyl compounds,
(d) 2 to 9% by weight of polyoxyalkylene compounds containing at least one atom of active hydrogen with an average molecular weight of the polyoxyalkylene chain of about 3000,
(e) 1 to 50% by weight of epoxy compounds containing at least one epoxy group alone or in mixture,
(f) 2 to 45% by weight of copolymerizable monomers alone or in mixture, (II)

(g) 2 to 25% by weight of unsaturated mono- and/or polyalcohols or their mixtures,
(h) 4 to 50% by weight of isocyanates alone or in mixture, In a further special embodiment of the invention a polyurethane copolymerization resin consists of the following components:

(I)

(a) 25 to 70% by weight of unsaturated fatty acids, 25% by weight of which are present as drying oils and the mixture has iodine numbers of 130 to 390,
(b) zero,
(c) 3 to 35% by weight of mono- and/or polyvalent organic hydroxyl compounds,
(d) 2 to 9% by weight of polyoxyalkylene compounds containing at least one atom of active hydrogen with an average molecular weight of the polyoxyalkylene chain of about 3000,
(e) 1 to 50% by weight of epoxy compounds containing at least one epoxy group alone or in mixture,
(f) 2 to 40% by weight of copolymerizable monomeric mixtures, whereby at least one monomer has to have one free carboxyl group and the copolymerizable monomer (f)—bearing free carboxyl groups—is contained in such quantities that the reaction product has acid numbers of about 10 to 80, whereby the acid numbers are based on carboxyl groups bound to secondary and/or tertiary carbon atoms, (II)

(g) 2 to 25% by weight of unsaturated mono- and/or polyalcohols or their mixtures,
(h) 4 to 50% by weight of isocyanates alone or in mixture, (III)

(i) and the polyurethane copolymerization resin containing carboxyl groups is converted into the water dispersable respectively water thinnable phase by addition of alkali and/or strong organic bases.

In a further embodiment of the invention a polyurethane copolymerization resin consists of the following components:

(I)

(a) 25–70% by weight of unsaturated fatty acids with iodine numbers of 130 to 390,
(b) 2 to 30% by weight of aliphatic, cycloaliphatic, aromatic carboxylic acids or hydroxy carboxylic acids alone or in mixture respectively their anhydrides if they exist,
(c) 3 to 35% by weight of mono- and/or polyvalent organic hydroxyl compounds,
(d) 2 to 9% by weight of polyoxyalkylene compounds containing at least one atom of active hydrogen with an average molecular weight of the polyoxyalkylene chain of about 200 to 50,000, alone or in mixture,
(e) 2 to 45% by weight of epoxy compounds containing at least one epoxy group, alone or in mixture,
(f) 2–45% by weight of copolymerizable monomeric mixture whereby at least one monomer has one free carboxyl group and the copolymerized monomer (f) which has free carboxyl groups is contained in such quantities that the reaction product has acid numbers of 10 to 80, whereby the acid numbers are based on carboxyl groups bound to secondary or tertiary carbon atoms, (II)

(g) zero,
(h) 4 to 50% by weight of isocyanate alone or in mixture, (III)

(i) and the polyurethane copolymerization resin containing carboxyl groups is converted into the water dispersable respectively water thinnable phase by addition of alkali and/or strong organic bases, In a further special embodiment of the invention the polyurethane copolymerization resin consists of the following components:

(I)

(a) 25 to 70% by weight unsaturated fatty acids, 25% by weight of which are present as wood oil and have iodine numbers of 130 to 390,
(b) 2 to 30% by weight aromatic polycarboxylic acids alone or in mixture respectively their anhydrides, if they exist, preferably trimellitic acid,
(c) 3 to 35% by weight of mono- and/or polyvalent organic hydroxyl compounds, preferably etherified butylphenol-formaldehyde resins,
(d) 2 to 9% by weight of polyoxyalkylene compounds, containing at least one atom of active hydrogen and with an average molecular weight of the polyoxyalkylene chain of 200 to 50,000, alone or in mixture,
(e) 2 to 45% by weight of epoxy compounds containing at least one epoxy group, alone or in mixture,
(f) 2 to 45% by weight of copolymerizable monomeric mixtures whereby at least one monomer contains at least one free carboxyl group and the copolymerizable monomer (f) which has free carboxyl groups is contained in such quantities that the reaction product together with component (b) has acid numbers of about 10 to 80 whereby the acid numbers are based on carboxyl groups bound to secondary and/or tertiary carbon atoms.

(II)

(g) 2 to 25% by weight of unsaturated mono- and/or polyalcohols or their mixtures,
(h) 4 to 50% by weight of isocyanates alone or in mixture.

(III)

(i) and the polyurethane copolymerization resin containing carboxyl groups is converted into the water dispersable respectively water thinnable phase by addition of alkali.

In a further embodiment of the invention the polyurethane copolymerization resin consists of the following components:

(I)

(a) 25 to 70% by weight of unsaturated fatty acids, 25% by weight of which are present as wood oil and the mixture has iodine numbers of 130 to 390,
(b) 2 to 30% by weight of aromatic polyhydroxylic acids alone or in mixture respectively their anhydrides, if they exist, preferably trimellitic acid,
(c) 3 to 35% by weight of mono- and/or polyvalent organic hydroxyl compounds preferably etherified butylphenol formaldehyde resin,
(d) 2 to 9% by weight of polyoxyalkylene compounds containing at least one atom of active hydrogen and with an average molecular weight of the polyoxyalkylene chain of about 200 to 50,000, alone or in mixture,
(e) 2 to 45% by weight of epoxy compounds containing at least one epoxy group, alone or in mixture,
(f) 2 to 45% by weight copolymerizable monomeric mixture, whereby at least one monomer has at least one free carboxyl group present and the copolymerizable monomer (f) which has free carboxyl groups is contained in such quantities that the reaction product together with component b has acid numbers of about 10 to 80, whereby the acid number are based on carbozyl groups bound to secondary and/or teretiary carbon atoms.

(II)

(g) zero,
(h) 4 to 50% by weight of isocyanates alone or in mixture, (III)

(i) and the polyurethane copolymerization resin containing carboxyl groups is coverted into the water dispersable respectively water thinnable phase by addition of alkali and/or strong organic bases.

For the products made by the method of the present invention 25 to 70% by weight of (preferably 35 to 55% by weight) unsaturated fatty acids of natural respectively synthetic origin are used optionally with drying or semi-drying oils in quantities of zero to 25% by weight, preferably in the range of zero to 15% by weight. The fatty acids respectively oils may contain up to 6% by weight maleic anhydride whereby the mixture has iodine numbers of 130 to 390.

Suitable unsaturated fatty acids are for example, elaeostearic acid, licanic acid, parinaric acid or linolenic acid with isolated and conjugated double bonds, and linoleic acid with isolated and conjugated double bonds. Further, a suitable admixture to the above-mentioned unsaturated fatty acids are those fatty acids with 10 to 30 carbon atoms which possess at least one unsaturated carbon double bond in the chain, all unsaturated fatty acids occurring in natural fatty oils, such as for example palmitoleic acid, petroselinic acid, oleic acid, elaidic acid, erucic acid, arachidonic acid, clupanodonic acid and the like. The total contents of these at least singly unsaturated fatty acids must however not exceed 30 percent by weight relative to the total mix. Preferably, the contents of these fatty acids is however less than 10 percent by weight. The proportion of saturated fatty acids which is always present in fatty acid mixtures, such as are obtained by saponification of natural oils, should not exceed 20 percent by weight and should if possible even be less than 10 percent by weight. As unsaturated fatty acids, it is furthermore possible to use the polybasic acids obtained by dimerization or oligomerization of unsaturated fatty acids, as well as cyclized monobasic acids. Preferably, unsaturated fatty acid mixtures, such as are obtained from natural vegetable and animal unsaturated fats by saponification, are used. Admixtures of natural rosin acids (colophony), up to a maximum of 20 percent by weight, and/or of maleic anhydride-styrene copolymers up to a maximum of 35 percent by weight, to the fatty acid mixture (a) are possible.

Such products manufactured from fatty acids having a pyrone structure as have been described in British patent specifications 827,361 and 844,620 are also suitable, as are their addition products with maleic acid, fumaric acid and maleic anhydride, which have been described in British patent specification 1,135,775, with the products of viscosity 30–120 poise again being preferred.

As natural, unsaturated fatty acids, cottonseed oil, lupin oil, corn oil, sesame oil, grapeseed oil, walnut oil, perilla oil, linseed oil, wood oil, safflower oil, oiticica oil and fish oil are for example suitable. Of these, wood oil, oiticica oil, safflower oil, linseed oil and fish oil are preferred. However the following are also suitable: fatty acids from dehydrated castor oil, which contain a high proportion of conjugated linoleic acid. Air drying and/or semi-drying condensation products, for example from wood oil and phenol-resols and/or etherified phenolresols, preferably butylphenol-resols, can also be used as drying and/or semi-drying oils.

Furthermore, other aliphatic, cycloaliphatic and aromatic carboxylic acids or hydroxycarboxylic acids, and/or their anhydrides where they exist, are for example suitable as an admixture to the above-mentioned unsaturated fatty acids used as component (b). As monocarboxylic acids there may for example be mentioned: trimethylacetic acid, pelargonic acid, glycollic acid, lactic acid, 3-hydroxypropionic acid, α-hydroxyisobutyric acid, 2-hydroxybutyric acid, 2-hydroxynonane-acid, 2-hydroxyoctadecane acid, 2-hydroxybenzoic acid, 3-hydroxybenzoic acid 4-hydroxybenzoic acid, 4-hydroxyphenylacetic acid, 3-hydroxy-2-naphthoic acid, 2-hydroxy-1-naphthoic acid, alkanemonocarboxylic acid, of which the carboxyl groups are bonded to tertiary or quaternary carbon atoms, having 8 to 18 carbon atoms, such as are obtained from carbon monoxide, water and monoolefins (according to Swiss patent specification 390,229), phenyl-acetic acid, acrylic or methacrylic acid, benzoic acid, p-tert.-butylbenzoic acid, 1-methylhexanehydrobenzoic acid and 2,4,5-trimethyl-hexanehydro-benzoic acid. Furthermore, it is possible to use, as component (b) polycarboxylic acids or their anhydrides, for example phthalic acid, phthalic anhydride, isophthalic acid, terephthalic acid, tetrahydrophthalic acid, tetrahydrophthalic anhydride, trimellitic acid, trimellitic anhydride, hemimellitic acid, pyromellitic acid, pyromellitic anhydride, prehnitic acid, prehnitic anhydride, mellophanic acid, benzene-pentacarboxylic acid, benzenepentacarboxylic anhydride, maleic anhydride, citraconic anhydride, itaconic anhydride, methaconic anhydride, aconitic anhydride, 2,6-naphthylenedicarboxylic acid, diphenyl-O,O'-dicarboxylic acid, and hexachlorendomethylenetetrahydrophthalic acid.

As polyhydric organic hydroxy compounds it is for example possible to use, as component (c), glycerine, pentaerythritol, di-pentaerythritol, ethylene glycol, diethylene glycol, trimethylolethane, trimethylolpropane, diallyl ethers of pentaerythritol, mannitol, sorbitol, bisphenol-A, hydrogenated bisphenol-A, 4,4'-hydroxyphenylmethane, 4,4-dihydroxyphenylbutane, 4,4'-dihydroxydiphenyl, cyclohexanediol, 1,4-cyclohexane-dimethanol, 2,2,4-trimethyl-1,3-pentanediol, ethoxylated bisphenol-A with 1 to 6 ethylene oxide molecules, propoxylated bisphenol-A with 1 to 6 propylene oxide molecules, ethoxylated pentaerythritol with about 12 ethylene oxide molecules, ethoxylated 4,4'-dihydroxydiphenol with 1 to 6 ethylene oxide molecules, ethoxylated 4,4-dihydroxyphenylmethane with 1 to 6 ethylene oxide molecules, and 1,2,6-cyclohexanetriol.

Phenol-resols and/or etherified phenol-resols, which still possess 2 to 6 free alcoholic hydroxyl groups per molecule, preferably having average molecular weights of 250 to 700, can be used conjointly, it being preferred for such an addition to be in the range of 3 to 10 percent by weight. Of these substances, the completely or partially hydrogenated phenol-resols are preferred. It is also possible to use phenolic resins based on bisphenol-A, but preferably with a low charge of formaldehyde (phenol:formaldehyde =1:0.8 to 1:1.3)

as dihydric to hexahydric alcohols.

Further, admixtures of copolymers containing hydroxyl groups, for example allyl alcohol-styrene with an average molecular weight of 500 to 3,000 and 0.3 to 0.6 OH equivalent per 100 g., can be added up to a maximum of 25 percent by weight.

Possible components (d) are polyoxyalkylene compounds which contain at least two active hydrogen atoms: propoxylated and ethoxylated (or mixed propoxylated and ethoxylated) alcohols, amines and alcoholamines, which possess at least one polyoxyalkylene oxide chain with a molecular weight of at least 200 to about 50,000 in their molecule. Here the following compounds are for example understood by polyfunctional base polyols, amines or alcoholamines: for example, ethylene glycol, diethylene glycol, triethylene glycol and tetraethylene glycol, butanediol, propanediol-1,2, propanediol-1,3, neopentyl glycol, pentaerythritol, trimethylolpropane, bisphenol-A, 4,4'-dihydroxyphenylmethane, 1,4-cyclohexanediol, ethylenediamine, 1,3-propanediamine, 1,3- and 1,4-butanediamine, 1,2-, 1,3-, 1,4-, 1,5- and 1,6-hexanediamine, phenylenediamine, toluylene-diamine, 4,4'-diaminodiphenylamine, 1,2,4- and 1,2,3-diaminobenzene and methyl - diethanolamine, butyl - diethanolamine, N - methyl-diethanolamine, N - butyl - diethanolamine, N - oleyl - diethanolamine, N-linolenyl-diethanolamine, N-linoyldiethanolamine, N-cyclohexyldiethanol, 4-aminophenyl and 2-hydroxyethylhydrazine.

Possible polyoxyalkylene compounds which only contain one atom of active hydrogen, and in which the polyoxyalkylene chain possess an average molecular weight of about 200 to 50,000 are: those obtained from monocarboxylic acid by catalytic alkoxylation or from monocarboxylic acid and polyoxyalkylene compounds which possess two atoms of active hydrogen, by a halfester reaction. As monocarboxylic acids, trimethyl-acetic acid, pelargonic acid, acrylic acid and methacrylic acid can here for example be employed. The monocarboxylic acids already mentioned as component (a) can also be used. Polyoxyalkylene compounds which possess an active hydrogen atom are also obtained from monoalcohols by alkoxylation or by etherification reaction with polyoxyalkylene compounds which possess two atoms of active hydrogen. Under this heading there are for example understood methyl alcohol, ethyl alcohol, propyl alcohol, isopropyl alcohol, butyl alcohol, isobutyl alcohol, allyl alcohol, benzyl alcohol, cyclohexanol, phenol, methylphenol, ethylphenol, butylphenyl, isobutylphenol, p-tert.-butylphenol and the compounds mentioned as component (f).

It is however also possible to esterify or trans-esterify the polyoxyalkylene compounds already mentioned, which contain at least two atoms of active hydrogen, with the unsaturated fatty acids and/or their drying oils mentioned under (a), and/or the monocarboxylic acids mentioned under (b), so that these retain only one active hydrogen atom. The polyoxyalkylene compounds which only contain one active hydrogen atom, can be used by themselves or mixed with the polyoxyalkylene compounds which contain at least two atoms of active hydrogen.

As polyoxyalkylene compounds with one or two atoms

Herein $R_1$ denotes an aliphatic or aromatic hydrocarbon radical and $n$ denotes zero or a small number.

Polyethers containing epoxide groups of general formula

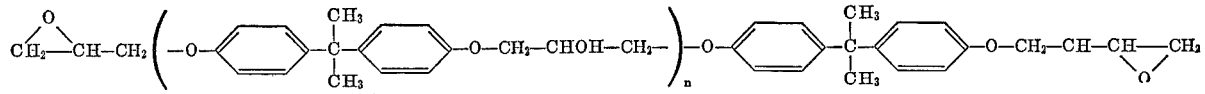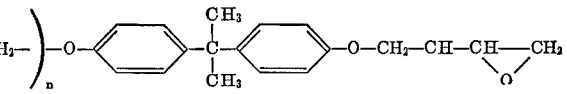

of active hydrogen it is also possible to use: compounds of the series of the isotridecanol-poly-glycol-ethers with more than 5 ethylene oxide molecules compounds of the series of the nonylphenoxy-poly(ethyelne oxide)-ethanols with more than 2 ethylene oxide molecules, as well as their mono-esters and diesters with ortho-phosphoric acid; compounds of the series of ethoxylated and/or propoxylated products from ethanolamine and fatty acid, wherein fatty acid is understood to include saturated and unsaturated fatty acid with 4 to about 22 carbon atoms, products with unsaturated fatty acid again being advantageous.

A special embodiment of the invention is characterized in that amounts of 2 to 8 percent by weight are employed as polyoxyalkylene compounds with an average molecular weight of 2000 to 4000.

Possible components (e) are for example compounds containing epoxide groups and optionally containing hydroxyl groups: epoxidized olefins diolefins and oligoolefins, such as 1,2,5,6-diepoxyhexane and 1,2,4,5-diepoxyhexane, epoxidized compounds with several cyclohexenyl radicals, such as diethylene glycol-bis-(3,4-epoxycyclohexanecarboxylate), 3,4 - epoxycyclohexylmethyl - 3,4-epoxycyclohexanecarboxylate and vinylcyclohexenedioxide and epoxycyclohexanol.

Particularly suitable compounds are polyesters with epoxide groups, such as are obtainable by reaction of a dicarboxylic acid with epihalogenohydrin or dihalogenohydrin, such as for example epichlorhydrin, dichlorhydrin or the like, in the presence of alkali. Such polyesters can be derived from aliphatic dicarboxylic acids, such as oxalic acid, succinic acid, glutaric acid, adipic acid, pimelic acid, suberic acid, azelaic acid, sebacic acid or from aromatic dicarboxylic acids, such as phthalic acid, isophthalic acid, terephthalic acid, 2,6 - naphthylene-dicarboxylic acid, diphenyl-o,o'-dicarboxylic and ethylene glycol-bis-(p-carboxylphenyl)-ether, which are employed individually or as mixtures. The polyesters essentially correspond to the formula

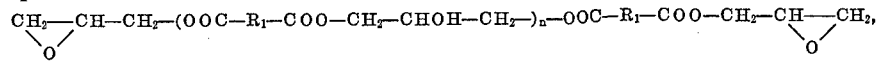

wherein $R_1$ represents an aliphatic or aromatic hydrocarbon radical, and $n$ is zero or denotes a small number. Compounds of the formula mentioned, of which the molecular weight does not exceed 3000, are very suitable. Those of which the molecular weight lies between 300 and 750 ar preferred.

The most suitable compounds are polyethers with epoxide groups, such as are obtained by etherification of a dihydric alcohol or diphenol with epihalogenohydrins or dihalogenohydrins, for example with epichlorhydrin or dichlorhydrin in the presence of alkali. These compounds can be derived from glycols, such as ethylene glycol, diethylene glycol, triethylene glycol, propylene glycol-1,2, propylene glycol-1,3, butylene glycol-1,4, pentanediol-1,5, hexanediol-1,6 and especially from diphenols such as resorcinol, pyrocatechol, hydroquinone, 1,4-dihydroxy naphthalene, bis-(4-hydroxyphenyl)-methane, bis-(4-hydroxyphenyl)-methylphenylmethane, bis-(4-hydroxyphenyl)-tolylmethane, 4,4'-dihydroxy-diphenyl and 2,2-bis(4-hydroxyphenyl)-propane.

The polyethers containing epoxide groups have the general formula

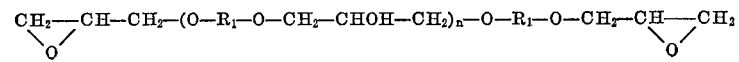

which contain 2,2-bis-(4-hydroxyphenyl)-propane as the starting compound should be very particularly highlighted, and of these, those polyethers having an epoxide equivalent weight of less than 1500, preferably 400 to 1200, are again preferentially used.

The epoxide compounds are employed in amounts of 1 to 25 percent by weight, preferably in the range of 3 to 15 percent by weight.

As component (f), it is possible to use copolymerizable monomers such as vinyl monomers of vinylidene monomers, individually or as a mixture. Amongst the monomeric vinyl compounds or vinylidene compounds, those which do not contain any free carboxyl groups are preferred, and the most preferred compounds of this nature include styrene, nuclear-substituted styrenes and styrene substituted in the side-chain, such as α-methylstyrene, α-ethylstyrene, α-chlorostyrene as well as vinyl-toluene.

Possible vinyl monomers which do not carry any free carboxyl groups are also: alkyl esters of the α,β-unsaturated monocarboxylic acids, such as methyl acrylate, ethyl acrylate, propyl acrylate, butyl acrylate, iso-butyl acrylate, octyl acrylate, 2-ethylhexyl acrylate, decyl acrylate, lauryl acrylate as well as the corresponding methylacrylates, ethylacrylates and phenylacrylates, propyl crotonate, butyl crotonate and the like. Further possible compounds are: hydroxylalkyl esters of the α,β-unsaturated carboxylic acids, such as 2-hydroxyethyl acrylate, 2-hydroxypropyl acrylate, 2-hydroxybutyl acrylate, 3-hydroxybutyl acrylate, 6-hydroxyhexyl acrylate and the corresponding methacrylates, ethacrylates, phenylacrylates, 2-hydroxyethyl maleate, di-(2-hydroxypropyl)-maleate and the corresponding fumarates, 2-hydroxy-3-chloropropyl acrylate, 2-hydroxy-1-phenylethyl acrylate, 2-hydroxy - 3 - butoxypropyl acrylate and the corresponding ethacrylates and phenyl-acrylates.

Other copolymerizable monomers, such as acrylamide, methacrylamide, etherified N-methylolacrylamide, etherified N-methylolmethacrylamide, acrylonitrile, methacrylonitrile and the like can be added, individually or mixed with one another, as an admixture to the monomer mixture. The vinyl and/or vinylidene proportion in the synthetic resin depends on the envisaged field of use as a binder.

In minor amounts, copolymerizable monomers carrying carboxyl groups can also be conjointly used, such as acrylic acid, methacrylic acid, cinnamic acid, β-benzoylacrylic acid, crotonic acid, ethylcrotonic acid, cyclohexenedicarboxylic acid and angelica acid, as well as α,β-ethylenically unsaturated polycarboxylic acids or their anhydrides, where they are capable of forming anhydrides, such as maleic acid, fumaric acid, citraconic acid, itaconic acid, methaconic acid and aconitic acid, and monoesters of the above-mentioned polycarboxylic acids with saturated, straight-chain monoalcohols with 1 to 4 carbon atoms, preferably methanol, maleic acid monomethyl ester, halogen-substituted acids, such as chloromaleic acid, and the like. The preferred α,β-ethylenically unsaturated carboxylic acids include: acrylic acid, methacrylic acid, maleic anhydride, maleic acid and fumaric acid.

The monomers carrying carboxyl groups can be reacted only mixed with one another, only mixed with the first-mentioned monomers not carrying any carboxyl groups, or mixed with the other components.

It is possible to admix dicyclopentadiene and its derivatives, up to a maximum of 25 percent by weight. Esterification, trans-esterification, etherification and polymerization takes place by heating at temperatures of between 100° C. and 290° C., preferably at 120° C. to 270° C., optionally in the presence of known catalysts, for example dibutyl-tin dilaurate, calcium acetate, lead oxide, sodium methylate, lithium ricinoleate, cobalt-butyl phthalate or ethylhexyl titanate.

As a result of the above-mentioned amounts, the esterification, etherification and trans-esterification reactions as well as polymerizations are carried out in such a way that monoesters, diesters or polyesters or mixtures of these are produced, with the resulting ester products being intended to have acid numbers of zero to 300, preferably less than 40, and possessing hydroxyl groups in order to be capable of further reaction.

The manufacture of the esters or ester-ethers, containing hydroxyl groups and optionally containing carboxyl groups, from components (a), (b), (c), (d), (e) and (f) can take place conjointly or stepwise, in various sequences, by heating. Thus for example (the brackets denote optionally)

(A) components (a), (b), (c), and (d) are esterified, and etherified with (e);
(B) components (a), (b), (c) and (d) are esterified, etherified with (e), and polymerized with (f);
(C) components (a), (b), (c), and (d) are esterified, etherified with (e) and esterified with (b);
(D) components (a), (b), (c) and (d) are esterified, etherified with (e) and polymerized with (f) and esterified with (b);
(E) component (e) is etherified with (c) and (d) and esterified with (a) and (b);
(F) component (e) is etherified with (c) and (d), esterified with (a), (b) and (d) and polymerized with (f);
(G) component (e) is etherified with (c) and (d), esterified with (a), (b) and (d), polymerized with (f) and esterified with (b);
(H) component (e) is etherified with (c) and (d), esterified with (a), (b) and (d) and subsequently esterified with (b);
(I) components (a), (b), (c), (d) and (e) are esterified and etherified;
(J) components (a), (b), (c), (d) and (e) are esterified and etherified, and polymerized with (f) and esterified with (b);
(K) components (a), (b), (c), (d) and (e) are esterified and etherified, and polymerized with (f);
(L) components (a) and (f) are polymerized and subsequently esterified or etherified with the components (b), (c), (d) and (e);
(M) components (d) is esterified with (a), (f) and (b) and subsequently esterified-etherified, and polymerized with (c), (e) and (f), and so on.

In manufacturing the components (I), two cases X and Y must be differentiated. Case X encompasses a component (I) which is obtained by appropriate selection and reaction of the starting components and represents an ester carrying hydroxyl groups which is practically free of carboxyl groups.

Such a component (I) according to case X is preferably manufactured if the polyurethane resin obtainable as the end product is to be capable of being dispersed in water and the aqueous polyurethane resin binder preparations are to be distinguished by their practically unlimited storage life and good air-drying properties. In order to obtain such polyurethanes which also have optimum properties, component (I) is, according to case X, synthesized from (a) 25–45% by weight
(b) 2–35% by weight
(c) 2–30% by weight
(d) 4–12% by weight, with an average molecular weight of 2000 to 4000
(e) 1–35% by weight and
(f) zero–45% by weight.

If, however, the polyurethane resin characterized above is to be used as a sole binder or in combination with other binders, in a form dispersed in water, for stovable coating agents, the proportion of (a), (b) and (e) in the above guide-line formulation for component (I), case X, is chosen within the following range:

(a) 25–35% by weight
(b) 2–30% by weight and
(e) 1–40% by weight.

The manufacture of component (I), case X, that is to say the manufacture of a component (I) which contains hydroxyl groups and is practically free of free carboxyl groups, can for example be carried out in accordance with the following procedure:

Procedure α: Components (a), (b), (c) and (d) are esterified by heating, optionally in the presence of catalysts, at about 155° C. to 260° C. and are subsequently etherified with (e) at 200° to 230° C.

Procedure β: Components (a), (b), (c) and (d) are esterified by heating, optionally in the presence of catalysts, to about 155 to 260° C., and are etherified with component (e) at 200° C. to 230° C. Thereafter component (f) is copolymerized thermally or catalytically.

Procedure γ: Components (a) and (d) are esterified at 155° C. to 200° C. and then esterified, etherified and copolymerized with component (b), (c), (e) and (f) by heating to 155°–260° C.

Procedure δ: Components (c) and (d) are esterified at 155 to 200° C. and subsequently esterified and etherified with component (a), (c) and (e) at 155° to 260° C., and copolymerized with component (f).

Procedure ε: Components (a) and (f) are thermally or catalytically copolymerized by heating and esterified with component (b), (c) and (d) (heating to 155°–260° C.) and subsequently etherified with component (e) at 200° to 230° C.

Procedure ζ: Component (f) possessing a carboxyl group and/or hydroxyl and/or amide and/or nitrile groups is esterified and/or etherified or reacted with component (d) by heating and is subsequently esterified with components (a) and (b) and etherified with component (e).

The preferred embodiments of the process include such new oil-modified polyurethane resins, free of carboxyl groups and capable of dilution with water, which according to the present invention are obtained from the following special component combinations: linseed oil fatty acid, polyethylene glycol (average molecular weight 3000), pentaerythritol, hydrogenated bisphenol - A, phthalic anhydride, epoxide resin manufactured from bisphenol-A and epichlorhydrin, having an epoxide equivalent weight of 470 to about 3000, and toluylene diisocyanate; linoleic acid, polyethylene glycol (average molecular weight 3000), hydrogenated bisphenol-A, terephthalic acid, epoxide resin manufactured from bisphenol-A and epichlorhydrin having an epoxide equivalent of 470 to about 3000, hydrogenated toluylenediisocyanate, diallyl ether of trimethylolpropane and styrene; linolenic acid, polyethylene glycol (average molecular weight 3000), polyethylene glycol (average molecular weight 2000), ethoxylated bisphenol-A with 2 ethylene oxide molecules, pentaerythritol, terephthalic acid, epoxide resin manufactured from bisphenol-A and epichlorhydrin, having an epoxide equivalent weight of 470 to about 3000, toluylenediisocyanate, dimerized toluylenediisocyanate, triallyl ether of pentaerythritol and styrene; linoleic acid, polyethylene glycol (average molecular weight 3000), pentaerythritol, hydrogenated bisphenol-A, terephthalic acid, isobutyl methacrylate, epoxide resin manufactured from bisphenol-A and epichlorhydrin, having an epoxide equivalent weight of 470 to about 3000; hydrogenated toluylenediisocyanate, and diallyl ether of trimethylol-propane; fish oil fatty acid with an iodine number of about 150 to 210, polypropylene glycol (average molecular weight 2000) or polyethylene glycol (average molecular weight 3000), pentaerythritol, hydrogenated bisphenol-A, terephthalic acid, epoxide resin manufactured from bisphenol-A and epichlorhydrin having an epoxide equivalent weight of 470 to about 3000, and toluylene-diisocyanate; fish oil fatty acid, polyethylene glycol (average molecular weight 3000), maleic anhydride-styrene copolymer, containing maleic anhydride and styrene in the molar ratio of 1:1 and having an acid number of 490 and a K-value of 15, pentaerythritol, phthalic anhydride, epoxide resin manufactured from bisphenol-A and epichlorhydrin, having an epoxide equivalent weight of 470 to about 3000, and toluylenediisocyanate; fish oil fatty acid, ethoxylated ethylenediamine (molecular weight 2750) allyl alcohol-styrene copolymer with 0.45 OH equivalent per 100 g., pentaerythritol, epoxide resin manufactured from bisphenol-A and epichlorhydrin, having an epoxide equivalent weight of 470 to about 3000, and toluylene-diisocyanate; safflower oil fatty acid, pentaerythritol, ethoxylated N-linolenyldiethanolamine (average molecular weight 2800), hydrogenated bisphenol-A, phthalic anhydride, epoxide resin manufactured from bisphenol-A and epichlorhydrin, having an epoxide equivalent weight of 470 to about 3000, toluylenediisocyanate and triallyl ether of pentaerythritol; fish oil fatty acid, 1,4-cyclohexanediol, ethoxylated 1,3-propanediamine (average molecular weight 3000), pentaerythritol, phthalic anhydride, lactic acid, epoxide resin manufactured from bisphenol-A and epichlorhydrin, having an epoxide equivalent weight of 470 to about 3000, toluylenediisocyanate, and unsaturated monoalcohol having an iodine number of 160; linolenic acid, polyethylene glycol (average molecular weight 3000); propoxylated 4,4-dihydroxydiphenyl with two molecules of propylene oxide, 1,2,6-cyclohexanetriol, pentaerythritol, epoxide resin manufactured from bisphenol A and epichlorhydrin, having an epoxide equivalent weight of 470 to about 3000, and toluylene diisocyanate; linoleic acid, trimethylolpropane, polyethylene glycol (average molecular weight 2500), pentaerythritol, phthalic anhydride, epoxide resin manufactured from bisphenol-A and epichlorhydrin, having an epoxide equivalent weight of 470 to about 3000, polyphenylisocyanate of general formula:

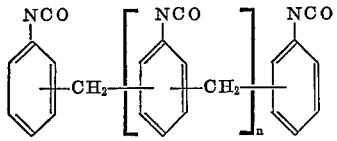

wherein $n$ denotes 1 to 3, and triallyl ether of pentaerythritol; linolenic acid, polyethylene glycol (average molecular weight 3000), pentaerythritol, methacrylic acid, epoxide resin manufactured from bisphenol-A and epichlorhydrin, having an epoxide equivalent weight of 470 to about 3000, toluylenediisocyanate and antimony triisocyanate; dehydrated castor oil fatty acid, trimethylolpropane, polyethylene glycol (average molecular weight 3000), epoxide resin manufactured from bisphenol-A and epichlorhydrin, having an epoxide equivalent weight of 470 to about 3000, styrene and toluylenediisocyanate.

In the preferred embodiment of the process, the components are so chosen, and so reacted under the conditions mentioned, that the resulting end products have a viscosity, according to Gardner-Holdt, of D–S, measured as 50% by weight strength solutions in butylglycol.

When manufacturing component (I) according to case Y, a component (I) is manufactured with this component being reacted, by appropriate choice of the starting compounds as to nature and quantity and their appropriate reaction, to give an ester carrying hydroxyl groups and carboxyl groups. This ester carrying hydroxyl groups and carboxyl groups, used as component (I) according to case Y, should have acid numbers of 1 to 300 preferably less than 40. In a special, preferred embodiment those esters carrying hydroxyl groups are manufactured as component (I) according to case Y, which contain at least one free carboxyl group, bonded to secondary and/or tertiary carbon atoms, in their molecule.

The use of component (I) according to case Y makes it possible to manufacture polyurethane resins as end products, which can both be dispersed in water and, after addition of ammonia or strong organic bases, dispersed in water or diluted with water.

Where the polyurethane resin obtained as the end product is manufactured using component (I), case Y, and is intended mainly to be capable of dispersion in water, it is necessary, when synthesizing component (I) according to case Y, for component (I) to have an acid number of 1 to 20, and the condensed proportion of condensed polyoxyalkylene compounds with 1 and/or 2 active hydrogen atoms, and with an average molecular weight of the polyoxyalkylene chain of 200 to 50,000, must be between zero and 10 percent by weight, preferably zero to 5 percent by weight.

Where the polyurethane resin obtainable as an end product is manufactured via component (I), case Y, and the resin must be capable of dispersion in water or dilution with water or be soluble in water, component (I) must possess an acid number of 1 to 40, and the proportion of condensed polyoxyalkylene compounds with 1 and/or 2 active hydrogen atoms and with an average molecular weight of the polyoxyalkylene chain of 200 to 50,000 must be between zero and 10 percent by weight. Furthermore, the last-mentioned polyurethane resins must be treated with alkalis and/or strong organic bases until the polyurethane resins have reached the desired capacity for dispersion in water, dilution with water or solution in water.

It is however also possible to manufacture, via component (I), case Y, polyurethane resins which possess free carboxyl groups, with the finished polyurethane resin having acid numbers of less than 10, it not being necessary to treat such polyurethane resins with alkali or strong organic bases to achieve the desired capacity for dispersion in water, dilution with water or solution in water. In order to manufacture such special polyurethane resins according to this invention, the aim when synthesizing component (I), case Y, must be for component (I) to have an acid number of 1 to 12 and for the proportion of condensed polyoxyalkylene compounds with 1 and/or 2 active hydrogen atoms to lie in the range of 5 to 10 percent by weight and the average molecular weight of the polyoxyalkylene chain to be about 2000 to 4000.

The manufacture of component (I), case Y, that is to say the manufacture of a component (I) which contains hydroxyl groups and free carboxyl groups, can for example be carried out in accordance with the following procedure.

Procedure $\eta$: Components (a), (b), (c) and (d) are esterified by heating at 155° to 260° C., optionally in the presence of catalysts, etherified with component (e) at 200° to 230° C., and subsequently esterified with component (b).

Procedure $\theta$: Components (a), (b), (c) and (d) are esterified by heating at 155° to 260° C., optionally in the presence of catalyst, etherified with component (e) at 200° to 230° C., and subsequently polymerized with component (f).

Procedure $\iota$: Components (a), (b), (c), (d) and (e) are esterified-etherified by heating at 155° to 260° C., optionally in the presence of catalysts, and subsequently esterified with (b).

Procedure κ: Components (a), (b), (c), (d) and (e) are esterified and etherified by heating at 155° to 260° C., optionally in the presence of catalysts, and subsequently polymerized with (f).

Procedure λ: Components (c) and (d) are etherified with (e), esterified with (a) and (b), and further esterified with (b).

Procedure μ: Components (c) and (d) are etherified with (e), esterified with (a) and (b) and polymerized with (f).

The selected esters containing hydroxyl groups and carboxyl groups, in which at least one free carboxyl group is bonded to secondary and/or tertiary carbon atoms (stage I), can be synthesized by matched selection of the acid components (b) and/or (e) in stage (I), that is to say by the conjoint use of, above all, polycarboxylic acids (b) and/or hydroxymonocarboxylic and polycarboxylic acids (b) and/or other substituted carboxylic acids (b), in which at least one carboxyl group is bonded to a secondary or tertiary carbon atom.

A further possibility of manufacturing usable esters, carrying hydroxyl groups, in stage (I) from components (a), (b), (c), (d), (e) and (f), these esters containing at least one free carboxyl group, bonded to secondary and/or tertiary carbon atoms, in their molecule, is provided by first etherifying components (a), (b), (c) and (d) by condensation to give esters carrying hydroxyl groups, which for practical purposes do not contain any free carboxyl groups in their molecule, with component (e) and subsequently copolymerizing with such copolymerizable monomers as component (f), as must contain at least one free carboxyl group, bonded to a secondary or tertiary carbon atom, in their molecule.

In each of the procedures here described for the manufacture of the esters, carrying hydroxyl groups, of component (I), the components (a) to (f) must be so matched that the component (I) possesses acid numbers of 1 to 300.

Suitable esters, for carrying hydroxyl groups, which contain at least one free carboxyl group on secondary and/or tertiary carbon atoms in their molecule, are for example:

Those from linseed oil fatty acid, trimethylolpropane, hydrogenated bisphenol-A, epoxide resin manufactured brom bisphenol-A and epichlorhydrin, having an epoxide equivalent weight of 470 to about 3000, and trimellitic anhydride; those from linseed oil fatty acid, polyethylene glycol (average molecular weight 3000), pentaerythritol, hydrogenated bisphenol-A, epoxide resin manufactured from bisphenol-A and epichlorhydrin, having an epoxide equivalent weight of 470 to about 3000, and phthalic anhydride; those from dehydrated castor oil fatty acid, isononanic acid, pentaerythritol, hydrogenated bisphenol-A, phthalic anhydride, epoxide resin manufactured from bisphenol-A and epichlorohydrin having an epoxide equivalent weight of 470 to about 3000, styrene and methacrylic acid; those from tall oil fatty acids, trimethylolpropane, adducts of bisphenol-A and 2 mols of propylene oxide, epoxide resin manufactured from bisphenol-A and epichlorhydrin, having an epoxide equivalent weight of 470 to about 3000, and trimellitic anhydride; those from tall oil fatty acids, pentaerythritol, adducts of bisphenol-A and 2 mols of propylene oxide, epoxide resin manufactured, from bisphenol-A and epichlorhydrin, having an epoxide equivalent weight of 470 to about 3000, and trimellitic anhydride; those from conjugated safflower fatty acid, trimethylolpropane, phthalic anhydride, polyethylene glycol (molecular weight 3000), epoxide resin manufactured from bisphenol-A and epichlorhydrin, having an epoxide equivalent weight of 470 to about 3000, styrene and methacrylic acid; those from dehydrated castor oil fatty acid, pentaerythritol, adducts of bisphenol-A and 2 mols of propylene oxide, epoxide resin manufactured from bisphenol-A and epichlorhydrin, having an epoxide equivalent weight of 470 to about 3000, vinyltoluene and acrylic acid; those from dehydrated castor oil fatty acid, trimethylolpropane, phthalic anhydride, epoxide resin manufactured from bisphenol-A and epichlorhydrin, having an epoxide equivalent weight of 470 to about 3000, methacrylamide and methacrylic acid; those from dehydrated castor oil fatty acid, pentaerythritol, adducts of bisphenol-A and 2 mols of propylene oxide, epoxide resin manufactured from bisphenol-A and epichlorhydrin, having an epoxide equivalent weight of 470 to about 3000, etherified N-methylolacrylamide and acrylic acid; those from dehydrated castor oil fatty acid, trimethylolpropane, epoxide resin manufactured from bisphenol-A and epichlorhydrin, having an epoxide equivalent weight of 470 to about 3000, phthalic anhydride and isobutyl acrylate; those from dehydrated castor oil fatty acid, trimethylolpropane, epoxide resin manufactured from bisphenol-A and epichlorhydrin, having an epoxide equivalent weight of 470 to about 3000, phthalic anhydride, α-methylstyrene, etherified N-methylolacrylamide, hydroxyethyl methacrylate and methacrylic acid; those from dehydrated castor oil fatty acid, trimethylolpropane, phthalic anhydride, epoxide resin manufactured from bisphenol-A and epichlorhydrin, having an epoxide equivalent weight of 470 to about 3000, trimellitic anhydride, styrene, methacrylic acid and 2-hydroxyethyl maleate.

As component (h), the following isocyanates can for example be employed:

Phenylethyl-isocyanate, 2,4,5 - trimethylphenylisocyanate, 4 - cyclohexyl-phenyl-isocyanate, diphenylmethane-4-isocyanate, 3,4,6 - trichlorophenyl-isocyanate, 3,4 - dichlorophenyl - isocyanate, 3,4,6 - trifluorophenylisocyanate, 3 - sulphofluoridephenyl - isocyanate, 2-chlorophenyl-isocyanate, 3-isothiocyanatophenyl-isocyanate, methyl-3-isocyanate-benzyl-ether, methoxymethyldiisocyanate, 4 - ethoxyphenol-isocyanate, 4 - carbethoxyphenyl-isocyanate, 4,4′-dichlorodiphenyl-ether - 2 - isocyanate, 3-isocyanate-benzenesulphomethylanilide, 4 - isocyanatoazobenzene, 1-naphthyl-isocyanate, 5 - nitro - 1 - naphthylisocyanate, tetrahydro - 1 - naphthylisocyanate, decahydro-2-naphthyl-isocyanate, phenanthryl-3-isocyanate, pyrenyl-3 - isocyanate, tert.-butyl-isocyanate, dodecyl-isocyanate, oleyl-isocyanate, octadecyl-isocyanate, methyl-isocyanate, di-α-(n-hexyl)-methyl - isocyanate, 1 - chloro-hexyl-6-isocyanate, 1-chlorobutyl-ether-propyl-isocyanate, 1 - cyanopropyl - 3 - isocyanate, isocyanatoacetic acid ether ester, isocyanatocaproic acid esters, isocyanatolinoleic acid esters, isocyanatolinolenic acid esters, methyl-ether-propylyisocyanate, isopropyl - ether-propyl-isocyanate, cyclohexyl-ether-propylisocyanate, phenyl - isocyanate, p-tolyl-isocyanate, benzyl-isocyanate, xylidyl-isocyanate, tetra- or hexa-methylenediisocyanate, arylenediisocyanate or their alkylation products, such as phenylenediisocyanates, naphthylenediisocyanates, diphenylmethanediisocyanates, toluylenediisocyanates, di- or tri-isopropylbenzenediisocyanates, or triphenylmethanetriisocyanates, p - isocyanatooctyl-thiolphosphoric acid triesters, p-isocyanatophenyl-thiophosphoric acid triesters, aralkyldiisocyanates, such as 1-(iso-cyanatophenyl)-ethylisocyanate or the xylylenediisocyanates, fluorine-substituted isocyanates, ethylene glycol-diphenyl-ether-2,2′-diisocyanate, diethylene glycol-diphenyl-ether-2,2′-diisocyanate, naphthalene-1,4 - diisocyanate, 1,1′ - dinaphthyl-2,2′-diisocyanate, bisphenyl-2,4′-diisocyanate, biphenyl-4,4′-diisocyanate, benzophenone-3,3′ - diisocyanate, fluorene - 2,7 - diisocyanate, anthraquinone-2,6-diisocyanate pyrene - 3,8 - diisocyanate, chrysene-2,8-diisocyanate,1 -methylbenzene - 2,4,6 - diisocyanate, naphthalene-1,3,7-triisocyanate, biphenylmethane-2,4,4′ - triisocyanate, triphenylmethane-4,4′,4″-triisocyanate, 3′ - methoxyhexane-diisocyanate, octane-diisocyanate, ω,ω′-diisocyanato - 1,4 - diethylbenzene, ω,ω′-diisocyanato-1,4-dimethylnaphthalene, cyclohexane-1,3-diisocyanate, 1 - isopropylbenzene-2,4-diisocyanate, 1-chlorobenzene-2,4-diisocyanate, 1-fluorobenzene - 2,4 - diisocyanate, 1-nitrobenzene-2,4-diisocyanate, 1 - chloro-4-methoxybenzene - 2,5 - diisocyantae, azobenzene - 4,4' - diisocyanate, benzeneazonaphthalene - 4,4' - diisocyanate, diphenyl-ether - 2,4 - diisocyanate, diphenyl-ether-4,4-diisocyanate and polyphenylisocyanate of general formula

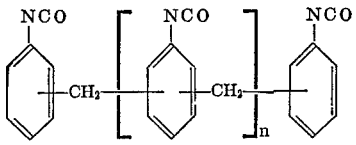

wherein $n$ denotes $= 1$ to 3.

Further, isocyanates of general formula

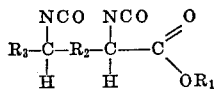

are also suitable, wherein $R_1$ is an alkyl, alkoxylalkyl, aryl, alkaryl, aralkyl or a halogen derivative, $R_2$ is lower alkylene or lower alkylidene radical, and $R_3$ is H or the radical

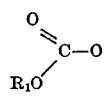

As such diisocyanates, the following can be employed: The esters of 2,6-diisocyanatocaproic acid, such as the methyl-methoxymethyl, 1,2-dichloropropyl and isopropyl esters. The corresponding diesters of 2,4-diisocyanatoglutaric acid, 2,5-diisocyanatoadipic acid, 2,6-diisocyanatopimelic acid, 2,7-diisocyanatosuberic acid and 2,9-diisocyanatosebacic acid, di-(isocyanatomethyl)-cyclobutane, hydrogenated xylenediisocyanate, hydrogenated diphenylmethanediisocyanate, hydrogenated diphenylethanediisocyanate, hydrogenated diphenylpropanediisocyanate, hydrogenated diphenylbutanediisocyanate, isophoronediisocyanate and trimethylhexanemethylediisocyanate. Further possibilities are also inorganic and organometallic isocyanates, for example antimony triisocyanate, silicon tetraisocyanate, dibutyl-tin triisocyanate, reaction products of polyhydric alcohols with polyisocyanates, for example the reaction product of 1 mol of trimethylolpropane with 3 mols of toluylenediisocyanate, and also polyisocyanates containing biuret groups, for example the reaction product of 1 mol of water and 3 mols of hexamethylenediisocyanate, as well as dimerized, trimerized or polymerized isocyanates.

Possible components (g) would be unsaturated fatty alcohols with 10 to 24 carbon atoms, which contain one or more double bonds in the molecule, that is to say for example decenol, dodecenol, hexadecenol, oleyl alcohol, linoleyl alcohol and linolenyl alcohol. In particular, unsaturated fatty alcohols from natural fatty acids can be employed as mixtures, such as are obtained by hydrogenation of drying or semi-drying oils so as to retain the double bonds.

Furthermore, up to 15 percent by weight of phenols modified with unsaturated fatty alcohols containing about 8 to 30 carbon atoms, such phenols being described in German displayed specification 1,268,137, can be conjointly used as an admixture to component (g). These admixtures are preferred in those cases where the end product is used as a binder for aqueous stoving lacquers, which are stoved after a certain drying time in order to evaporate the water.

Furthermore, monohydric or polyhydric alcohols which contain one or more of $\beta,\gamma$-ethylenically unsaturated ether groups can be used, individually or as a mixture, as component (g). The alcohol ether can for example be derived from an allyl, methylallyl, ethallyl, chlorallyl or crotonyl alcohol. Particularly suitable alcohol ethers are those which contain only one free hydroxyl group. Examples of such compounds are glycerine-diallyl ether, trimethylolpropane-diallyl ether and pentaerythritol-triallyl ether. The resulting esters and/or ester-ethers from reaction (I), which carry hydroxyl groups and if necessary carry carboxyl groups, are employed by warming to 40–130° C., preferably 70-120° C., with 0.05 to 50 percent by weight, preferably 5 to 25 percent by weight, of isocyanates, used individually or as a mixture, and 0 to 60 percent by weight of unsaturated monoalcohols and/or polyalcohols or their mixtures. When using fatty alcohols, such as are obtained from natural fatty acids as mixtures by hydrogenation, the percentage proportion of fatty acid must be taken into account.

When using unsaturated ether-alcohols, the use of the triallyl ether of pentaerythritol, in an amount of 5 to 35 percent by weight, is advantageous. Unsaturated fatty alcohols, which are obtained by modification with phenols (see German displayed specification 1,268,137) are employed in those cases in which products are to be manufactured which must display special anti-corrosive properties, and in particular in an amount of 10 to 50, preferably 20 to 30, percent by weight. To accelerate the reaction, organo-metallic compounds or tertiary amines can be used as catalysts. The reaction time is about 4 to 14 hours.

If the reaction of components (g) and (h) with the esters and/or ester-ethers, originating from the first reaction stage and carrying hydroxyl groups and optionally also carrying carboxyl groups, is not carried out conjointly, component (g) (unsaturated alcohol) should be reacted with component (h) (isocyanate) to give an intermediate product, by first introducing the isocyanate and adding the unsaturated alcohol in portions with good stirring, during which the reaction temperature is kept at about 70 to 110° C. This intermediate product is then added in portions to the ester or ester-ether from the first reaction stage, carrying hydroxyl groups and optionally also carrying carboxyl groups, whilst warming to about 70–120° C., the ester or ester-ether being introduced first. In these reaction it is necessary to ensure that the reagents are employed in such amounts that the ratio of the total hydroxyl equivalent to the isocyanate group equivalent is 1.01 to 1.45, preferably 1.02 to 1.25.

The urethanization reaction, that is to say the reaction of the product (I) to give the product (II), can be carried out in the presence or absence of an organic solvent or solvent mixture, such as ketones, esters, ester-ethers of the ethylene glycols or diethers of the ethylene glycols. Working with solvents in the urethanization reaction is preferred, if the end products are to have a lower viscosity. After the reaction with the monoisocyanates or polyisocyanates, no free isocyanate groups may be present in the resulting resin molecule. Maximally, the resin may contain not more than 0.1 percent by weight of unreacted isocyanate after the reaction.

To achieve adequate dispersibility in water or solubility in water, and improvement of the flow properties and of the gloss in pigmented coating agents using the new polyurethane resins free of carboxyl groups, it can be necessary conjointly to use organic solvents which are infinitely soluble in water or at least largely miscible with water, when dissolving the resins in water. These organic solvents can be employed in amounts of about zero to 40 percent by weight, preferably 10 to 40 percent by weight, and serve to yield clear solutions on dilution of the resin solution with water to a solids contents of about 30 to 70 percent by weight. Suitable solvents of this nature are for example monoethers and diethers of ethylene glycol and diethylene glycol with lower monohydric alcohols, such as ethanol, n- and i-propanols, n- and i-butanols such as for example methylglycol, ethylglycol, propylglycol, isopropylglycol, butylglycol, diethylene glycol-diethyl ether, and also acetone-alcohol, lower ketones, such as acetone and methyl ether ketone, and in small amounts also methyl isobutyl ketone.

Where the finished polyurethane resins possess free carboxyl groups, and these cannot be converted into a state where they are capable of dispersion in water or dilution with water merely by means of organic solvents which are infinitely miscible with water or at least largely miscible with water, it is necessary to add water-soluble alkalis and/or strong organic nitrogen bases in sufficient amounts to achieve the desired capacity for dispersion in water, dilution with water or solution in water.

As alkalis, sodium hydroxide, potassium hydroxide and/or ammonia can mainly be used. By organic strong bases there are understood those organic nitrogen bases which in 10% strength aqueous solution at 25° C. show a pH value of at least 8.

Suitable strong nitrogen bases are: volatile alkylamines, such as triethylamine, diethylamine and trimethylamine. It is also possible to use tertiary, secondary or primary alkylolamines, such as triethanolamine, diethanolamine, monoethanolamine, N-dimethylethanolamine, N-methylethanolamine, N-diethanolamine, monoisopropanolamine, diisopropanolamine and triisopropanolamine.

The new polyurethane resins according to the invention can be used in coating compositions either unpigmented or pigmented and/or with filler present. They can for example be applied to timber, plastics, papers, cardboards, concrete, brickwork, plaster or also iron and steel as well as nonferrous metals, with or without pretreatment, such as passivation, phosphatization, electrochemical treatment, galvanizing, tin-plating or other metallization according to various processes, using such pigments or other resins as separate at the anode if a DC voltage is applied, including the electrophoretic method of application. Pigments and/or fillers are for example— without thereby restricting the use—red iron oxide, carbon black, lead silicochromate, strontium chromate, Blanc Fix, micronized varieties of baryte, micro-talc, colloidal chalk, diatomaceous earth, china clay, titanium dioxide, green chromium oxide and others.

The conjoint use of strongly basic pigments, such as zinc oxide, zinc chromate, lead carbonate, basic lead sulphate, red lead, and calcium plumbate, is surprisingly possible in most cases for polyurethane resins free of carboxyl groups. These pigments do not tend to thicken or precipitate. The ratio of the pigment to the binder depends on the pigment type employed and the proposed end use. In most cases the pigment-binder ratio will be 0.5:1 to 3:1. Only in the case of the electrophoretic application can the pigment contents also be less than 0.5%.

The polyurethane resins according to the invention can be employed as air-drying or stoving binders or sole binders, in the form of aqueous dispersions for coating agents, alone or in combination with copolymer dispersions of the following compositions:

60% by weight of butadiene and 40% by weight of styrene; 5% by weight of butadiene and 45% by weight of styrene and 5% by weight of butyl acrylate; 40% by weight of butadiene, 50% by weight of styrene and 8% by weight of butyl acrylate and 2% by weight of hydroxyethyl methacrylate, 55% by weight of butyl acrylate, 40% by weight of styrene and 5% by weight of methacrylic acid. Vinyl acetate homopolymers and vinyl acetate-acrylate copolymers, as well as pure acrylate copolymers or other dispersions, can also be admixed. The quantity ratio in parts by weight of the dispersions to the polyurethane resin according to the invention can be 5:95 to 95:5.

Furthermore, the new, water-soluble, epoxide-modified polyurethane resins can be employed in combination with strene-butadiene copolymer dispersions, as binders for coating agents which can be processed by means of mechanical or electrophoretic methods of application.

The invention also relates to the use of the new water-dispersible or water-soluble epoxide modified polyurethane resins in combination with styrene-butadiene copolymer dispersions, as binders for coating agents which can be processed by mechanical or electrophoretic application processes.

In the case of high proportions of dispersions, the polyurethane resins according to the invention serve more to modify the dispersions, for example with respect to adhesion to chalking substrates.

The invention furthermore relates to the use of the new oxidatively drying polyurethane resins in binders and/or coating agents which can be dispersed in water or diluted with water, as sole binders for air-drying lacquers or also stoving lacquers, or mixed with other binders for air-drying lacquers or also for stoving lacquers. One use of the new polyurethane resins is to employ them as sole binders, or mixed with other binders, in coating compositions which can be deposited electrophoretically, together with such pigments as deposit on the anode when a DC voltage is applied.

The air-drying polyurethane resins used as binders according to the invention can also be stoved at elevated temperature. When used as binders in stoving lacquers, it can be advantageous to admix water-soluble or at least hydrophilic, low molecular heat-curable aldehyde condensation products, such as for example phenolresols and/or condensation products which form aminoplastics.

Mixing the new water-soluble polyurethane resins with relatively low molecular, at least hydrophilic, thermosetting condensation products, such as reaction products which form aminoplastics, and/or phenolresols and/or etherified phenolresols, results in greater cross-linking of the stoved films and hence in a further improvement of their technical lacquer properties, such as hardness, gloss, corrosion protection and the like.

By thermosetting there are also to be understood those condensation products which when heated alone, reach a state which whilst relatively high molecular, is not yet infusible. It is also not absolutely essential for the admixed condensation products in themselves to possess solubility in water; it is merely necessary for their hydrophilic character to suffice to give adequate compatibility in combination with the new water-soluble polyurethane resins which act as plasticizers, that is to say stoved clear lacquer films should be homogeneous, and in the aqueous coating agents manufactured therefrom no separation of the binder constituents must occur at the working concentration.

As components for aqueous stoving lacquers, the new water-soluble polyurethane resins can also be used together with fatty acid esters containing carboxyl groups, fatty acid adduct esters, especially maleic acid in the form of an adduct, and alkyd resins which can be diluted with water and have an acid number of between 30 and 120.

Thermosetting, hydrophilic, low molecular condensation products which form aminoplastics are aldehyde reaction products of such compounds capable of reaction with aldehydes, such as urea, ethyleneurea, dicyandiamide and aminotriazines, such as melamine, benzoguanamine, acetoguanamide and formoguanamide. The above-mentioned compounds can be reacted with aldehydes, such as formaldehyde, acetaldehyde, crotonaldehyde, acrolein, benzaldehyde, furfurol and the like. Amongst the aldehydes, aldehyde-forming compounds such as paraformaldehyde, paraldehyde and trioxymethylene, should also be considered. The preferred aldehyde is formaldehyde, and the preferred aldehyde-binding compounds are melamine and urea. The reaction takes place in the customary molar ratios, that is to say in a customary formaldehyde molar ratio of 1:1.5 to 1:4 in the case of urea resins, and in a formaldehyde molar ratio of 1:1.5 to 1:6 for melamine resins.

The etherification products of the lowest half-ethers of glycol and diglycol, monoethyl ether of the alkylene glycol, such as monoethyl ether of the ethylene glycol, with methylolmelamines, such as have already been described in Austrian patent specification 180,407, have also proved successful as binders for stoving lacquers in the present instance.

A preferred position is occupied by low molecular condensation products of melamine with formaldehyde having a melamine-formaldehyde ratio of 1:4 to 16, which has been almost completely etherified with methanol. Ethers of nitrogen-containing polymethylol compounds which are partially esterified with dicarboxylic acids or etherified with hydroxy-carboxylic acids, such as are for example obtained by trans-esterification of hexamethoxymethylmelamine with adipic acid, are also suitable. Stoving lacquers according to the invention can contain 5 to 50 percent by weight of these condensation products.

Examples of suitable thermosetting, hydrophilic, low molecular condensation products are phenol-alcohols, that is to say products which are still low molecular and are obtained by condensation of monohydric or polyhydric phenols with aldehydes, such as formaldehyde, acetaldehyde, crotonaldehyde, acrolein, benzaldehyde, furfurol and the like, or formaldehyde-yielding compounds, such as paraformaldehyde, paraldehyde or trioxymethylene. Formaldehyde or a formaldehyde-yielding compound which is obtained in an alkaline medium in a known manner, such as for example hexamethylenetetramine, is the preferred aldehyde. Suitable phenols are phenol and phenols which are substituted within the o-, o'-p-position, but can be condensed with formaldehyde, such as cresol or xylenol. Phenols which are obtained from alkylphenols, such as propylphenol and butylphenol, especially p-tert.-butylphenol, are very suitable. Further, resols from binuclear phenols, such as diphenol and bisphenol A, are suitable. In particular, those resols based on bisphenol A are suitable which contain approx. 1.75 to 2.5 mols of formaldehyde, in the form of an adduct, per mol of bisphenol A. Phenolcarboxylic acid obtained by condensation of formaldehyde or formaldehyde-yielding compounds with suitable phenolcarboxylic acids, can also be very successfully used. Amongst the phenolcarboxylic acids which can be condensed with formaldehyde, 4,4-bis(4-hydroxyphenyl)-valeric acid occupies a preferred position. The most favourable results are again obtained if 1.75 to 2.5 mols of formaldehyde are bonded per mol of phenolcarboxylic acid. The manufacture of further suitable phenolcarboxylic acid resols is for example described in German displayed specification 1,113,775. The phenolcarboxylic acid resols, especially those based on 4,4-bis-(4-hydophenyl)-valeric acid, are well suited to combination to give the products according to the invention which are intended to be used according to the invention as coating compositions and lacquer binders which can be deposited electrophoretically. It is very advantageous if at least a part of the formaldehyde condensation products is etherified with lower monohydric aliphatic alcohols with 1 to 4 C atoms, such as ethanol, methanol, propanols and butanols. Preferred phenolresols which can be diluted with water are those which have been obtained by reaction of phenolaldehyde condensation products, etherified with alcohol, with aliphatic monohydroxy-carboxylic acids or dihydroxycarboxylic acids or their esters, as is described in the displayed documents of Belgian patent specification 724,923.

Combinations with the new polyurethane resins, in which condensation products which form aminoplastics or phenoplastics are present to the extent of 10 to 30 percent by weight, relative to solids contents, are preferred.

For the electrophoretic method of application, it is advantageous not merely to admix the thermosetting condensation products of the type already explained above, namely phenoplastics and/or aminoplastics, but to subject the components to a reaction. The reaction, which can be described as precondensation, in general takes place at temperatures of 70° to 120° C., and it is necessary to ensure as far as possible, by suitably conducting the reaction, that an esterification of the components does not occur, but that instead a polyetherification takes place as far as possible. A suitable way of conducting the reaction for example consists of carrying out the reaction of components in the presence of an acid catalyst, such as phosphoric acids, p-toluenesulfonic acid or benzoic acid, at temperatures between 70° C. and 120° C. In doing so, the heating is stopped immediately the acid number has dropped by about 10 units, compared to the initial value of the acid number of the reaction mixture. This can preferably be achieved by employing etherified hydrophilic, thermosetting condensation products as phenoplastics and/or aminoplastics. To achieve adequate trans-etherification it is also advantageous to carry out the reaction in vacuo.

The binders for stoving lacquers, combined in this way, can themselves be manufactured by bringing their components together in the usual manner. In general it is appropriate to mix the water-soluble salts of other synthetic resins of ammonia or amines, or mixtures of ammonia and amines, and the new polyurethaneresins, with the other components in the form of concentrated aqueous solutions which can optionally contain minor amounts of water-soluble organic solvents, and then, if necessary, to adjust the concentration and the pH value of the mixed solutions to the desired values. The pH value of the desired solution should in general appropriately be approx. 7.5 to 9.0, especially approx. 8.0; if necessary, it can be readjusted with ammonia or organic strong nitrogen bases after the resins have been stored for a prolonged period.

The combined stoving lacquers manufactured from the binders can contain the relevant customary additives, for example minor amounts of water-soluble organic solvents, in the presence of which the components of the stoving lacquer have been manufactured, and/or of other solvents, such as monoalkyl ethers of diethyl glycol and triethylene glycol, as well as compounds of hexavalent chromium, such as ammonium dichromate, as well as soluble dyestuffs, pigments, agents for improving the levelling, corrosion protection agents, stabilizers and/or curing catalysts.

The combined stoving lacquers can be applied to the articles to be lacquered using the customary methods; they are above all suitable for lacquering sheet metals. Here it is a particular advantage of the lacquers that they can also be deposited on the sheet metals by the electrophoresis process. The stoving of the lacquers can take place at temperatures of about 80° to 200° C., preferably of about 100° to 180° C., and over a time interval of about 10 to 80, preferably of about 20 to 60, minutes, depending on the stoving temperature.

Example 1

A mixture of 512 g. of linseed oil fatty acid, 134 g. of trimethylolpropane, 344 g. of an adduct of one mol of bisphenol-A and two mols of propylene oxide, 0.06 g. of dibutyl-tin dilaurate and 2 ml. of triphenylphosphite was esterified at 155° to 220° C. over the course of 7 hours, with water being separated off, until an acid number of 6 was reached. Subsequently, a vacuum was applied at 200° C. in order to remove residual water, and thereafter 98 g. of an epoxide resin (manufactured from bisphenol A and epichlorhydrin and having an epoxide equivalent weight of 470, in the form of a solution in xylene (about 34 g. of xylene), and 0.04 g. of dibutyl-tin dilaurate were added at 200° C. The reaction mixture was kept at 210° C. for 6 hours. Subsequently, 148 g. of trimellitic anhydride were added and esterification was continued at 170° C. until an acid number of 46 was reached. Thereafter a vacuum was applied at 170° to 160° C., in order to remove residual water and xylene. After cooling to 80° C., 123 g. of acetone were added and 102 g. of toluylene diisocyanate were added dropwise at a reflux temperature of 80°–82° C. over the course of 14 hours. The reaction mixture was kept for a further hour at the reflux temperature and thereafter diluted with 124 g. of butylglycol. A vacuum was applied in order to distill off acetone. The resin, which showed an acid number of 39, was adjusted to pH 7 with triethylamine, diluted to 70% with butylglycol, and further diluted to 48% solids with water.

After addition of cobalt naphthenate, 0.12% of Co metal calculated relative to solid resin, the resin solution dried in 1½ hours when applied at a wet film thickness of 120μ. The resulting coatings were distinguished by very good anticorrosion properties.

60 g. of 70% by weight of the resin according to Example 1 were ground with 10 g. of monobutyl ether of ethylene glycol, 100 g. water, 62 g. iron oxide red and 30 g. micro-talcum in a ball-mill for 48 hours. The lacquer starting material was dried and applied on metal with 0.7 g. water dilutable cobalt drier (6% Co-metal). After curing a hard elastic lacquer film is obtained which shows good adhesion and good anti-corrosion resistance.

Example 2

A mixture of 632 g. of linseed oil fatty acid, 126 g. of polyethylene glycol (average molecular weight 3000), 154 g. of trimethylolpropane, 64 g. of an adduct of one mol of bisphenol A and two mols of propylene oxide, 0.06 g. of dibutyl-tin dilaurate and 2 ml. of triphenylphosphite was esterified at 155° to 220° C. over the course of 7 hours, with water being separated off, until an acid number of 6 was reached. Subsequently a vacuum was applied at 200° C. in order to remove residual water, and thereafter 118 g. of an epoxide resin, manufactured from bisphenol A and epichlorhydrin and having an epoxide equivalent weight of 470, in the form of a solution in xylene (about 40 g. of xylene), and 0.04 g. of dibutyl-tin dilaurate, were added at 200° C. The reaction mixture was kept for 6 hours at 210° C. After having cooled to 140° C., 306 g. of xylene were added, and a mixture of 172 g. of styrene and 4 g. of p-tert.-butyl peroxide was added dropwise over the course of 4 hours at a reflux temperature of 160–162° C. The reaction mixture was polymerized for a further 14 hours, and in order to achieve a solids content of 80% by weight, a further 12 g. of p-tert.-butyl peroxide had to be added in 4 parts in time intervals of 2 hours. Thereafter a vacuum was applied in order to remove xylene and small remnants of monomers. After having cooled to 70° C., 86 g. of acetone were added, and 134 g. of toluylene diisocyanate were added dropwise over the course of 6 hours at a reflux temperature of 102° to 104° C. After a further hour, 142 g. of monobutyl ether of ethylene glycol were added, and the entire amount of acetone was distilled off in vacuo. The resin was diluted to 60% by weight solids content with monobutyl ether of ethylene glycol and further diluted to 45% by weight solids content with water.

After appropriate addition of drier, the resulting dispersion dried, as in Example 1, in 2½ hours.

Example 3

A mixture of 684 g. of linseed oil fatty acid, 106 g. of polyethylene glycol (average molecular weight 3000), 108 g. of pentaerythritol, 88 g. of an adduct of one mol of bisphenol A and two mols of propylene oxide, 0.06 g. of dibutyl-tin dilaurate and 2 ml. of triphenylphosphite was esterified at 155° to 220° C. over the course of 8 hours, with water being separated off, until an acid number of 7 was reached. Subsequently a vacuum was applied at 200° C. in order to remove residual water, and thereafter 168 g. of an epoxide resin, manufactured from bisphenol A and epichlorhydrin, having an epoxide equivalent weight of 470, in the form of a solution in xylene (about 54 g. of xylene), and 0.04 g. of dibutyl-tin dilaurate were added at 200° C. The reaction mixture was kept for 6 hours at 210° C. After having cooled to 80° C., 82 g. of acetone and 54 g. of the triallyl ether of pentaerythritol were added, and 146 g. of toluylene diisocyanate were added dropwise over the course of 16 hours at a reflux temperature of 102° to 104° C. The reaction mixture was kept for a further hour at the reflux temperature and thereafter diluted with 154 g. of monobutyl ether of ethylene glycol. In order to distill off acetone, a vacuum was applied. The resin was diluted to 58% by weight with monobutyl ether of ethylene glycol and dispersed in water to 45% strength by weight.

The resulting dispersion dried, after appropriate addition of drier as in Example 1, in 2 hours. The lacquer coatings showed good resistance to corrosion after air drying for one week at room temperature.

120 g. of 40% by weight of a dispersion obtained according to Example 3 were mixed and stirred with an aqueous 40% by weight of acrylate copolymerization dispersion (50% by weight of butylacrylate, 46% by weight of styrene and 4% by weight of methacrylic acid) at a temperature of 60° to 65° C. After cooling the aqueous clear starting material was mixed with cobalt-drier (0.08 water dilutable cobalt metal contents calculated relative to solid resin) and applied at a wet film thickness of 120μ on glass plates. The dried coatings had good water resistance and in pigmented form high gloss.

Example 4

A mixture of 522 g. of tall oil fatty acid, 64 g. of polyethylene glycol (average molecular weight 6000), 160 g. of trimethylolpropane, 58 g. of pentaerythritol, 86 g. of phthalic anhydride, 0.06 g. of dibutyl-tin dilaurate and 2 ml. of triphenolphosphite was esterified and further reacted, as in Example 3, with 132 g. of an epoxide resin, 64 g. of the triallyl ether of pentaerythritol and 144 g. of toluylene diisocyanate. The resulting dispersion yields coatings which after addition of drier dry in about 2½ hours.

Example 5

A mixture of 476 g. of tall oil fatty acid, 116 g. of trimethylolpropane, 386 g. of an adduct of one mole of bisphenol A and two mols of propylene oxide, 0.04 g. of dibutyl-tin dilaurate and 2 ml. of triphenylphosphite was esterified at 155° to 220° C. over the course of 7 hours, with water being separated off, until an acid number of 7 was reached. Subsequently a vacuum was applied at 200° C. in order to remove residual water. Thereafter 154 g. of an epoxide resin, manufactured from bisphenol A and epichlorhydrin, having an epoxide equivalent weight of 470, in the form of a solution in xylene (about 50 g. in xylene), and 0.04 g. dibutyl-tin dilaurate were added at 200° C. The reaction mixture was kept for 6 hours at 210° C. Subsequently, 94 g. of trimellitic anhydride were added and esterification continued at 170° C. until an acid number of 29 was reached. Thereafter, a vacuum was applied at 170° to 160° C., in order to remove residual water and xylene. After having cooled to 80° C., 173 g. of acetone were added and 144 g. of toluylene diisocyanate were added dropwise over the course of 16 hours at a reflux temperature of 76 to 78° C. The reaction mixture was kept for a further hour at the reflux temperature and thereafter diluted with 118 g. of monobutyl ether of ethylene glycol. A vacuum was applied in order to distill off acetone. The resin was treated with triethylamine at 60 to 70° C. until pH 6.8 was reached, and was diluted with water at 70 to 80° C. to 40% solids content.

The finely divided dispersion dried, after addition of 0.12% of Co metal (calculated relative to solid resin) as a drier, in 2½ hours when applied at a wet film thickness of 120μ.

Example 6

A mixture of 512 g. tall oil fatty acid, 128 g. of trimethylolpropane, 362 g. of an adduct of one mol of bisphenol A and two mols of propylene oxide, 0.06 g. of dibutyl-tin dilaurate and 2 ml. of triphenylphosphite was esterified and reacted with 98 g. of an epoxy resin and with 148 g. trimellitic anhydride and 104 g. of toluylene diisocyanate according to Example 1. The resin was diluted with monobutyl ether of ethylene glycol to 70% by weight and adjusted to pH 7 with triethylamine and diluted with water to 48% solids content.

The lacquer films obtained after drying were distinguished by very good resistance to corrosion. 85 g. of 100% by weight of the resin according to Example 6 and 15 g. hexamethoxymethylol melamine were diluted with monobutylether of ethylene glycol to a solids content of 60% by weight after neutralization with trimethylamine and then diluted with water to 45% by weight. After drying with 0.08% by weight of water-dilutable cobalt-metal the resin solution was applied to metal and stoved for 30 minutes at a temperature of 140° C. The coatings showed good surface hardness and good resistance to solvents, benzene and fuel. 80 g. of 100% by weight of the resin according to Example 6 and 20 g. of 100% by weight of butylphenol resin obtained by reaction of 1 mol p.-tert.-butylphenol and 1,7 mols formaldehyde in an alcalic medium after two days were neutralized, the salts removed by washing with water and diluted with monobutyl ether of ethylene glycol to 60% by weight solids content and neutralized with triethylamine. After drying with 0.08% by weight of cobalt-metal and solution with water to 40% by weight a film was applied to metal by stoving at 120° C. for 40 minutes. The coatings showed corrosion resistance.

Example 7

The method according to Example 6 was repeated, however, instead of toluylene diisocyanate a mixture of 66 g. of toluylene diisocyanate and 46 g. of methoxymethyl diisocyanate was used. After drying as prescribed in Example 1 the coatings dried in about 2 hours. Subsequently the films were stoved 30 minutes at 150° C. Coatings were obtained with very good corrosion resistance.

Example 8

A mixture of 428 g. of tall oil fatty acid, 118 g. of trimethylolpropane, 416 g. of an adduct of one mol of bisphenol A and 2 mols of propylene oxide, 44 g. of p.-tert.-butylbenzoic acid, 0.04 g. of dibutyl-tin-dilaurate and 2 ml. triphenylphosphite was esterified and reacted (as in Example 1) with 86 g. of an epoxy resin, 148 g. of trimellitic acid anhydride and 94 g. of toluylene diisocyanate. The resin was diluted with monobutylether of the ethylene glycol to 60% by weight solids content and adjusted to pH 7 with triethylamine and diluted with water to 48% by weight solids content. The lacquer coatings obtained after appropriate addition of drier showed extraordinarily good resistance to corrosion.

Example 9

The procedure according to Example 8 was repeated with a mixture of 248 g. of linseed oil fatty acid and 180 g. of conjugated linseed oil fatty acid being employed instead of tall oil fatty acid. The coatings showed good adhesion to the substrate and good resistance to corrosion.

Example 10

A mixture of 260 g. of linseed oil fatty acid, 168 g. of wood oil, 120 g. of natural tall resin, 374 g. of an adduct of one mol bisphenol A and two mols propylene oxide, 132 g. glycerin, 34 g. of an epoxy resin manufactured of bisphenol A and epichlorhydrin with an epoxy equivalent mixture of 470 g. and 44 g. of a 70% by weight of methanol solution of a butylphenol resin obtained by reacting of one mol p.-tert.-butylphenol and 1.5 mols formaldehyde in an alkaline medium at 40–70° C. in methanol and subsequent adjustment to pH 4 and reaction for etherification at 60° C. with 1,4 g. of lithium ricenoleate and 2 ml. diphenylphosphite esterified, is reacted and subsequently (according to Example 1) with 150 g. of trimellitic acid anhydride and 122 g. of toluylene diisocyanate reacted. The resin was diluted with monobutyl ether of ethylene glycol to 60% by weight of solids content, and adjusted to pH 7 with triethylamine and diluted with water to 48% by weight of solids content. After appropriate addition of drier the coatings showed an extraordinarily good resistance to corrosion.

Example 11

A mixture of 384 g. of linseed oil fatty acid, 312 g. of trimethylolpropane, 84 g. of an epoxy resin manufactured from bisphenol A and epichlorhydrin, having an epoxy equivalent weight of 1650, 98 g. of polyethylene glycol (average molecular weight 3000), 224 g. of phthalic anhydride, 0.06 g. of dibutyl-tin dilaurate and 1 ml. triphenylphosphite were reacted at 155° to 225° C. for 12 hours until an acid number of 18 was reached. A vacuum was then applied at 180° to 200° C. in order to remove residual water. After cooling to 90° C., 230 g. of acetone, 58 g. of triallylether of pentaerythritol and 0.04 g. of dibutyl-tin dilaurate were added. Subsequently 144 g. of toluylene diisocyanate were added dropwise under intensive reflux at a temperature of 70° C. within 8 hours. After a further hour 1100 g. of mono-butylether of ethylene glycol were added and 1340 g. of water were added dropwise under intensive stirring at about 70 to 80° C. After having distilled off the acetone 2.4 g. of triethylamine were added at 65° C. and under stirring cooled down to 45°–50° C. The fine-structured dispersion dried after appropriate addition of drier in two hours when coated on to glass plates.

Example 12

A mixture of 392 g. of dehydrated castor oil fatty acid, 182 g. of an adduct of one mol bisphenol-A and two mols of propylene oxide, 64 g. of an epoxy resin, manufactured of bisphenol-A and epichlorhydrin with an epoxy-equivalent weight of 1650, 94 g. of trimethylolpropane, 38 g. of polyethylene glycol (average molecular weight 3000), 48 g. of phthalic anhydride, 0.04 g. of dibutyl-tin dilaurate and 2 ml. of triphenylphosphite were reacted at 155 to 220° C. until an acid number of 2 was reached. After cooling to 140° C., 304 g. of xylol were added and a mixture of 364 g. of styrene, 64 g. of methacrylic acid and 8 g. of p.-tert.-butylperoxide was added dropwise under reflux at 154° to 156° C. within 4 hours. The reaction mixture was polymerized by heating further 4 hours, and vacuum was applied to remove xylol and residual not polymerized monomers. After cooling to 70° C., 162 g. of acetone and 108 g. of triallylether of pentaerythritol were added and 84 g. of toluylene diisocyanate were added dropwise under reflux at 74 to 76° C. within 8 hours. After a further hour from the reaction mixture (as stated in Example 11) a fine structured dispersion was made, after addition of cobalt siccatives the coatings dried to films free from tackiness and showed good mechanical properties.

I claim:

1. A process for the manufacture of oxidatively drying, carboxyl group containing epoxide-modified polyurethanes or polyurethane copolymer resins, which can be diluted with water or dispersed in water characterized in that:

(I)

(a) 25 to 45 percent by weight of unsaturated fatty acids possessing iodine numbers of about 130 to 390, (b) 2 to 35 percent by weight of saturated aliphatic, saturated cycloaliphatic or aromatic mono- or polycarboxylic acids or their anhydrides, having carboxyl groups bonded to secondary or tertiary carbon atoms, or mixtures thereof, (c) 2 to 30 percent by weight of monohydric or polyhydric organic hydroxyl compounds, individually or as a mixture, (d) 4 to 12 percent by weight of polyoxyalkylene compounds containing at least one atom of active hydrogen and having an average molecular weight of 200 to 50,000, and (e) 1 to 35 percent by weight or epoxide compounds containing at least one epoxide group, are reacted stepwise by heating to 155° to 260° C. until the reaction product has an acid number of 0 to 300 and the resulting hydroxyl esters are thereafter reacted by warming to 70° to 120° C. with (II)

0.05 to 50 percent by weight of isocyanates, the reaction of components (I) with component (II) being carried out in a ratio of total hydroxyl equivalents to isocyanate equivalents of 0.01 to 1 to 1.45 to 1.

2. The process according to claim 1 wherein copolymerizable monomers, individually or as a mixture, are added to components (I) in an amount to 45 percent by weight, based on the weight of reactants in (I), at least one of said monomers having one free carboxyl group and being present in an amount so that the reaction product has an acid number of 10 to 80, the acid number being based on carboxyl groups bound to secondary or tertiary carbon atoms.

3. The process in accordance with claim 1 wherein unsaturated monohydric alcohols or unsaturated polyalcohols, individually or as a mixture, are present in component (II) in an amount up to 65 percent by weight.

References Cited

UNITED STATES PATENTS

| | | | |
|---|---|---|---|
| 3,012,984 | 12/1961 | Hudson | 260—835 |
| 3,461,103 | 8/1969 | Keberle | 260—75 |
| 3,351,575 | 11/1967 | Gilchrist | 260—19 |
| 3,471,388 | 10/1969 | Koral | 260—18 |
| 2,788,335 | 4/1957 | Barthel | 260—2.5 |
| 2,989,491 | 6/1961 | Sattler | 260—835 |
| 3,437,615 | 4/1969 | Hanson | 260—22 |
| 3,477,977 | 11/1969 | Schnell | 260—22 |
| 3,463,750 | 8/1969 | Ghosh | 260—22 |

FOREIGN PATENTS 1,056,191    1/1967    Great Britain    260—18

DONALD E. CZAJA, Primary Examiner

W. E. PARKER, Assistant Examiner

U.S. Cl. X.R.

260—18 EP, 22 TN, 29.2, 32.6, 835, 858

UNITED STATES PATENT OFFICE
CERTIFICATE OF CORRECTION

Patent No. 3,758,427      Dated September 11, 1973

Inventor(s) THEMISTOKLIS KATSIMBAS, ET AL.

It is certified that error appears in the above-identified patent and that said Letters Patent are hereby corrected as shown below:

ABSTRACT, Line 18:
"copolymers" should be ---copolymer---.

ABSTRACT, Line 32:
"polyhydric hydroxy" should be ---polyhydric organic hydroxy---.

Column 3, line 28:
"weigh tof" should be ---weight of---.

Column 3, lines 41 through 44:
"(g) 4 to 50% by weight of isocyanates alone or in mixture," should be ---(g) zero
  (h) 4 to 50% by weight of isocyanates alone or in mixture,---.

Column 4, line 6:
"hydroxy" should be ---hydroxyl---.

Column 6, line 40:
"number" should be ---numbers---.

Column 6, lines 40 and 41:
"carbozyl" should be ---carboxyl---.

UNITED STATES PATENT OFFICE
CERTIFICATE OF CORRECTION

Patent No. 3,758,427  Dated September 11, 1973

Inventor(s) THEMISTOKLIS KATSIBAS, ET AL.

It is certified that error appears in the above-identified patent and that said Letters Patent are hereby corrected as shown below:

Column 7, lines 73 and 74:
"hydroxyphenylmethane" should be ---dihydroxyphenylmethane---.

Column 8, line 50:
"possess" should be ---possesses---.

Column 9, line 13:
"(ethyelne" should be ---(ethylene---.

Column 9, line 45:
"dicarboxylic and" should be ---dicarboxylic acid and---.

Column 11, line 59:
"components (I)" should be ---component (I)---.

Column 14, line 71:
"catalyst" should be ---catalysts---.

Column 15, line 65:
"manufactured, from" should be ---manufactured from---.

Column 16, line 32:
"trifluorophenylisocyanate" should be ---trifluorophenyl-isocyanate---.

Column 16, line 44:
"α-(n" should be ---α(n---.

UNITED STATES PATENT OFFICE
CERTIFICATE OF CORRECTION

Patent No. 3,758,427  Dated September 11, 1973

Inventor(s) THEMISTOKLIS KATSIBAS, ET AL.

It is certified that error appears in the above-identified patent and that said Letters Patent are hereby corrected as shown below:

Column 17, line 1:
"diisocyantae" should be ---diisocyanate---.

Column 19, line 19:
"filler" should be ---fillers---.

Column 19, line 64:
"syrene" should be ---styrene---.

Column 19, line 69:
"epoxide modified" should be ---epoxide-modified---.

Column 20, line 51:
"acetoguanamide and formoguanamide" should be
---acetoguanamine and formoguanamine---.

Column 20, line 73:
"1:4 to 16" should be ---1:4 to 1:6---.

Column 21, lines 24 and 25:
"bisphenol A" should be ---bisphenol-A---.

Column 21, line 28:
"bisphenol A" should be ---bisphenol-A---.

UNITED STATES PATENT OFFICE
CERTIFICATE OF CORRECTION

Patent No. 3,758,427        Dated September 11, 1973

Inventor(s) THEMISTOKLIS KATSIBAS, ET AL.

It is certified that error appears in the above-identified patent and that said Letters Patent are hereby corrected as shown below:

Column 22, line 28:
"diethyl" should be ---diethylene---.

Column 22, line 54:
"bisphenol A" should be ---bisphenol-A---.

Column 23, lines 33, 44 and 45 each occurrence:
"content" should be ---contents---.

Column 24, line 40:
"g dibutyl" should be ---g of dibutyl---.

Column 26, line 74:
"or epoxide" should be ---of epoxide---.

Signed and sealed this 16th day of July 1974.

(SEAL)
Attest:

McCOY M. GIBSON, JR.         C. MARSHALL DANN
Attesting Officer         Commissioner of Patents